Oct. 18, 1938.  E. GERHARD  2,133,615
ULTRA-SHORT WAVE RECEIVING SYSTEM
Filed Jan. 21, 1936
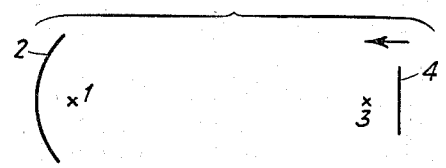
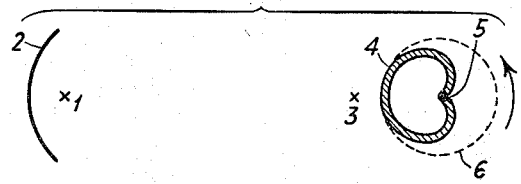
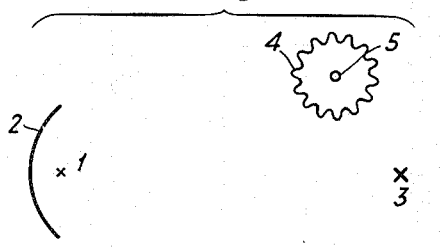
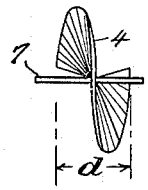
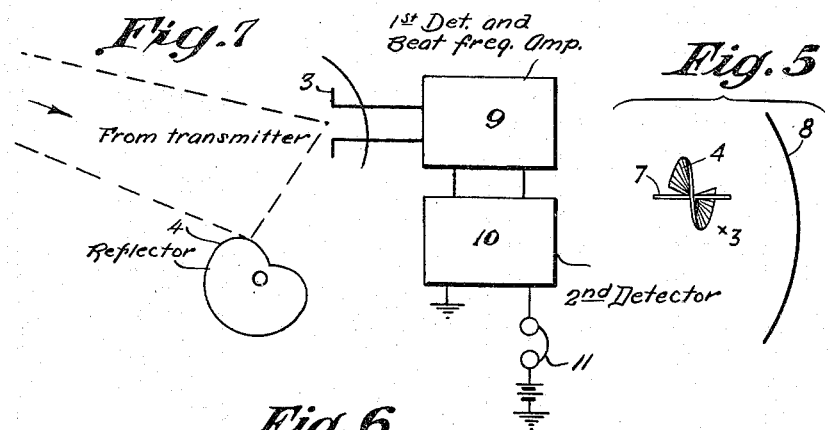
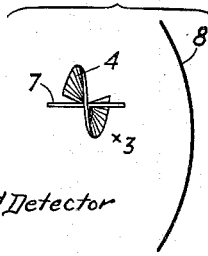
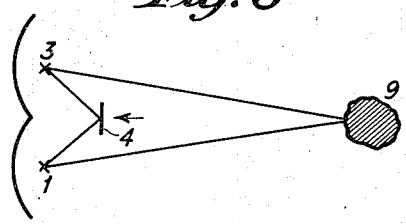
INVENTOR.
ERNST GERHARD
BY H. S. Grover
ATTORNEY.

Patented Oct. 18, 1938

2,133,615

UNITED STATES PATENT OFFICE 2,133,615

ULTRA-SHORT WAVE RECEIVING SYSTEM

Ernst Gerhard, Berlin, Germany, assignor to Telefunken Gesellschaft für Drahtlose Telegraphie m. b. H., Berlin, Germany, a corporation of Germany Application January 21, 1936, Serial No. 60,016
In Germany January 5, 1935

7 Claims. (Cl. 250—20)

The present invention relates to apparatus for and a method of obtaining beat reception of very short electro-magnetic waves. The invention itself is carried out by the application of the Doppler's effect.

Hitherto, in systems for the reception of ultrashort waves of, for instance, decimeter length, the principle of beat reception could not be employed successfully as in case of longer waves. That is to say, a superheterodyning of the received oscillations with a local oscillator did not produce satisfactory results. In fact a superheterodyne circuit dependent upon maintaining a constant frequency difference between the incoming carrier wave and the frequency of a local oscillator required too sensitive adjustments for maintaining a constant frequency audible beat note. In other words, the available equipment for obtaining satisfactory results, according to the methods generally employed for heterodyning a carrier wave of a not too high frequency, has proved practically useless for ultra-short waves.

The invention proposes a new way of carrying out beat reception of electro-magnetic waves of any shortness such as, for instance, cm. or mm.-waves.

In accordance with the invention in utilizing the Doppler's effect, a wave is produced deviating by a small value from the length of the receiving wave, and the two waves are subjected to interference.

The Doppler's effect, as is known, is due to a relative movement between a source of radiation and a radiation receiver. The frequency of the oscillations received increases as compared with the frequency of the oscillations sent out if the source of radiation and the receiver move towards each other. Conversely, the said frequency decreases if they move away from each other. The source of radiation need not necessarily be the transmitter proper. A reflector, for instance, may likewise serve as radiation source.

My invention will now be described in more detail, reference being had to the accompanying drawing in which Figure 1 shows diagrammatically and in the simplest form the theory of my invention, Figs. 2 to 6 inclusive show preferred embodiments, and Fig. 7 illustrates certain details of a heterodyne receiving system hereinafter described.

In Fig. 1, item 1 is a transmitter sending out, with the aid of the reflector 2, a beam of ultrashort waves of, for instance, 10 cm. in length in the direction of the receiver 3. In back of the receiver 3 there is placed a reflector 4 moved towards the receiver in the direction of the arrow and with the speed $v$. If $F_1$ is the frequency of the transmitter wave there will be produced in the receiver 3 besides the wave of the frequency $F_1$ directly received from the transmitter, a further shortened wave due to the movement of the reflector 4, and whose frequency $F_2$ is determined by the relation:

$$F_2 = F_1 \frac{(1+v/c)}{(1-v/c)}$$

The beat frequency produced by the superposition of the two frequencies $F_1$ and $F_2$ will be (as long as $v$ is essentially lower than the speed of light):

$$F_1 - F_2 = 2F_1 \, v/c$$

At a speed of movement of the reflector of, for instance, $v=10$ m/sec. a beat frequency will be produced in the chosen example which is equal to 200 cycles per second. Hence an audible sound is produced in the output of the receiver 3. The value of the beat frequency is practically independent of small variations in the wave length and almost wholly dependent upon the speed of movement $v$.

Since the speeds of movement to be here considered can be maintained extremely constant with the means available in the art, it is possible to produce in this manner an approximately constant intermediate frequency which is relatively independent of small fluctuations of the wave length of the transmitter.

In Fig. 2, the reflector 4 consists of a metallic hollow cylinder of cardioid-like base surface (shaded part) rotatable about an axis 5 extending at a right angle to the direction between the transmitter and the receiver. In rotating the cylinder the effective portion of the reflecting metal wall gradually changes its distance from the receiving antenna for obtaining the desired effect. It will be observed that, where the reflecting surface is either concave or convex, different portions thereof become effective as a reflector toward the receiving point 3 of the incident waves from a given direction, as the surface itself is rotated. In order to maintain a low resistance of air friction and in order to balance the rotating mass the reflector cylinder 4 will be preferably completed to form a total circular cylinder 6 by means of non-reflecting material.

As shown and claimed, the reflector is conformed to any suitable cylindrical surface such as is defined by a straight generatrix a point on which always intersects a given closed curve representing the outline of the cylindrical base. Thus, in Fig. 2, the generatrix follows a cardioidal pattern, while in Fig. 3 the pattern is gear-shaped and hence the cylindrical surface is said to be "channelled". If the base were to be made circular, then the axis of rotation of the cylindrical surface must needs be excentric, in order to produce the desired results. In Fig. 3, however, the channelled surface is symmetrical with respect to the rotational axis 5. The receiving antenna 3 is suitably positioned with respect to the direction of approach of an incident wave from the transmitter 1 and with respect to the reflecting cylinder 4 so that radiant energy may be simultaneously collected both as directly propagated and as reflected.

In Fig. 4 the reflector is shown to consist of a disk wound into a spiral shape and rotating about an axis 7 extending parallel to the direction of approach of an incident wave. The pitch $d$ of disk 4 may, if necessary, be so chosen as to be smaller than $\lambda/4$ of the received wave so as to avoid influences upon the amplitude of the receiving energy.

Fig. 5 shows the application of a reflector according to Fig. 4 as an auxiliary reflector in front of a receiver 3 provided with a main reflector 8. The auxiliary reflector 4 may, in this case, be very small since the energy is highly concentrated by the main reflector 8.

Fig. 6 shows an arrangement in which transmitter 1 and receiver 3 are disposed adjacent each other. The receiver 3 is so arranged that it indicates the reflected radiation of a body 9 in the radiation field of the transmitter 1. Also in this case a reflector 4 is provided by whose movement a wave emanating from the transmitter 1 is caused to be reflected toward the receiver 3 and the path so traversed by this reflected wave is periodically varied in length.

Fig. 7 shows more in detail the method of heterodyning the unmodulated carrier wave which is directly incident upon a receiving antenna 3 with the same wave reaching the antenna over a longer path and by reflection from a rotatable reflector 4 whose effective reflecting area is caused to periodically approach and recede from the antenna 3. Conventional receiving apparatus may be employed such as a beat frequency detector and amplifier 9 feeding to a second detector 10 the output energy from which may be utilized in any suitable responsive device 11. It is apparent that a beat frequency will be produced by varying the phase relation between the directly incident wave and the reflected wave when these waves are simultaneously collected by the antenna 3.

I claim:

1. The method of signaling which comprises the steps of transmitting an unmodulated ultra-high frequency carrier wave, receiving said wave over two paths in space, one of which is a direct path and the other is an indirect path in which is interposed a reflecting surface, said surface being cyclically varied in such a manner as to correspondingly modify the frequency of the carrier wave at the receiver by the Doppler's effect, heterodyning the two received frequencies, and detecting the cyclically varied beat frequency.

2. Apparatus comprising a rotatable metallic member, the surface of which has a variable radius about the center of rotation and has reflective properties with respect to incident radio waves, a receiving antenna located adjacent said surface, means for rotating said metallic member in such a manner that different effectively reflective portions thereof are moved toward and away from said receiving antenna at a speed which is low as compared with the speed of light, and means for heterodyning the waves directly incident upon said antenna with waves collected thereon after reflection from said metallic member.

3. In an ultra-short wave receiving system, an antenna in combination with a movable reflector, different portions of which are adapted to be made successively effective with respect to an incident wave from a given source, means for cyclically varying the distance between the antenna and the effective portion of said reflector, thereby to produce an interference pattern between the wave received by said antenna over a direct path from said source and the same wave collected by said antenna after traversing a longer path which includes the effective portion of said reflector.

4. A system in accordance with claim 3 and having said reflector in the form of a cardioidal surface.

5. A system in accordance with claim 3 and having said reflector in the form of a channelled cylindrical surface and rotatable about the cylindrical axis.

6. A system in accordance with claim 3 wherein the means for varying the distance between the antenna and the effective portion of the reflector is operative to produce distance variations that are small compared with a quarter wave length of the received waves.

7. A system in accordance with claim 3 and having said reflector formed as a cylindrical surface the axis of which is substantially perpendicular to the direction of approach of said incident wave.

ERNST GERHARD.